March 23, 1965  C. H. BAKER  3,174,276
FLUID-ENGINE PISTON AND CYLINDER ARRANGEMENT
Filed July 30, 1962
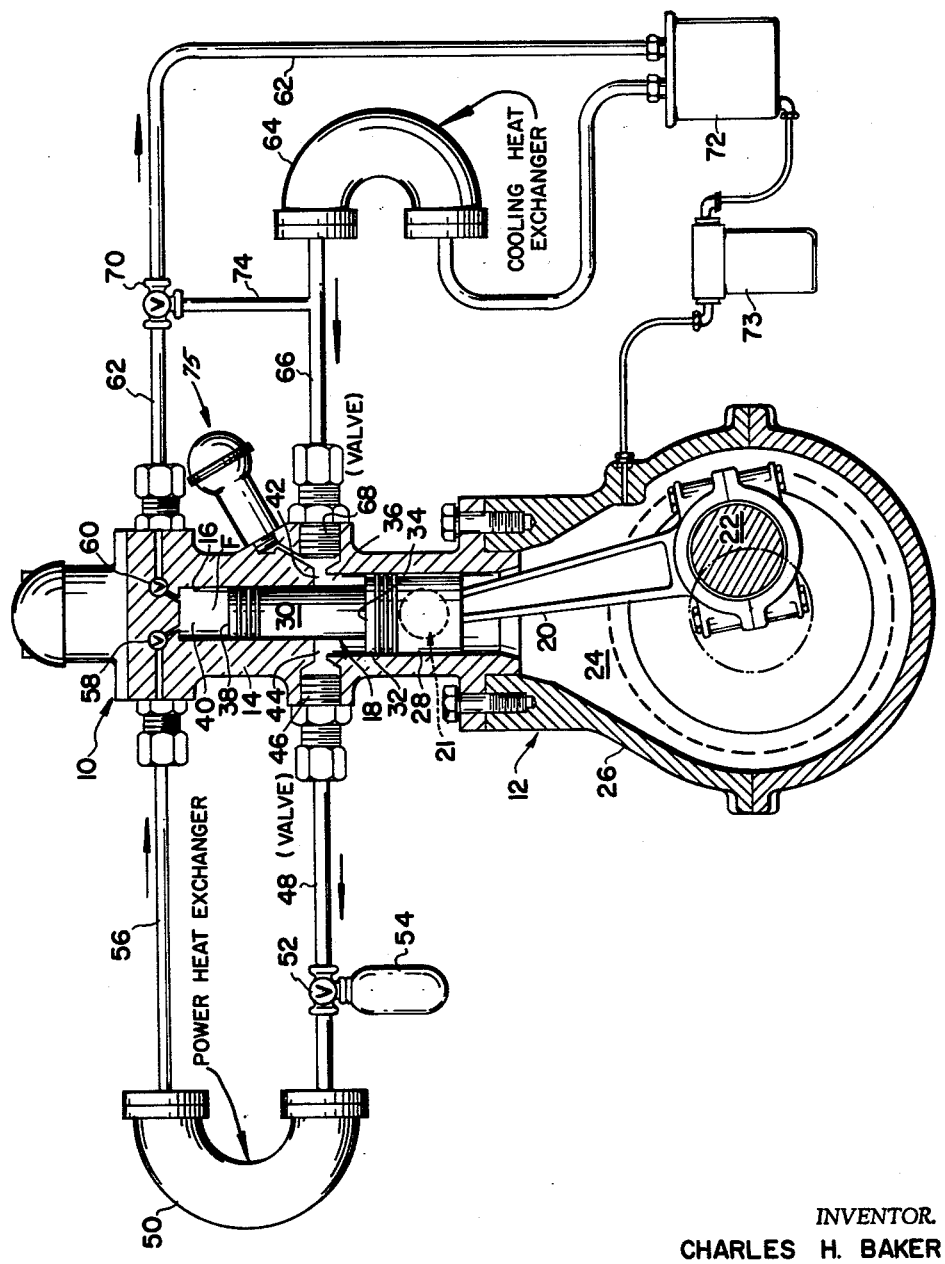
INVENTOR.
CHARLES H. BAKER
BY
ATTORNEY 3,174,276
FLUID-ENGINE PISTON AND CYLINDER
ARRANGEMENT
Charles H. Baker, Cleveland, Ohio, assignor to Cleveland
Pneumatic Industries, Inc., Cleveland, Ohio, a corporation of Ohio
Filed July 30, 1962, Ser. No. 213,401
6 Claims. (Cl. 60—24)

This invention relates to thermodynamic engines in which working fluids traverse a thermodynamic cycle to produce power and more particularly pertains to a novel or improved piston and cylinder arrangement therefor.

In fluid-type engines of the type disclosed herein a working fluid, compressed and heated, is expanded against a working surface within an expansion chamber of a piston-cylinder arrangement to produce mechanical power. The working fluid, in an initial condition, is compressed then heated and subsequently directed to the expansion chamber whereat the working fluid expands against the working surface of the piston-cylinder arrangement surface. After expansion, and at a reduced temperature and pressure, the working fluid is directed to a unit whereat the working fluid is cooled to the initial (before compression) condition. In a fluid engine of this type, the above set forth thermodynamic cycle is traversed by a suitable working fluid having desirable volumetric expansion characteristics and advantageous thermal properties. To provide a fluid engine of the type above disclosed, when requirements for minimum size and weight, advantageous piston loading, and the elimination of harmful bearing loads, are desired, a novel piston and cylinder arrangement has been designed to satisfy the above mentioned requirements.

Therefore, it is the principal object of this invention to provide a piston and cylinder arrangement in a fluid-type engine and system in which a working fluid traverses a thermodynamic cycle wherein the expansion and compression chambers of the engine are arranged such that there is no reversal of loading on the piston member.

It is another object of this invention to provide a novel piston and cylinder arrangement in a fluid-type engine and system in which a working fluid traverses a thermodynamic cycle wherein the compression and expansion chambers of the engine are disposed at the same end of the piston connecting rod.

It is still another object of this invention to provide a piston and cylinder arrangement for a fluid-type engine and system in which a working fluid traverses a thermodynamic cycle wherein the expansion and compression chambers of the engine are disposed upon movement of the piston to maintain compressive loading on the connecting rod associated with the piston member substantially reducing harmful bearing loads on the piston and rod connecting means.

A further object of this invention is to provide a piston and cylinder arrangement for a fluid engine and system in which a working fluid traverses a thermodynamic cycle wherein the expansion and compression chambers of the engine are disposed in a manner facilitating the construction of an engine of minimum size and weight and eliminating the need for bulky wrist pin and connecting rod arrangements.

A still further object of the invention is to provide a piston and cylinder arrangement for a fluid engine and system in which a working fluid traverses a thermodynamic cycle wherein the piston comprises a base portion and an extended portion having a diameter less than the base portion forming a shoulder therebetween and providing a chamber between the extended portion, the shoulder and the cylinder.

These and other objects and important features of the invention will be apparent from a study of the specification following taken with the drawing, which together show, illustrate, describe and disclose certain preferred embodiments and modifications of the invention and what is now considered to be the best mode of practicing the principles thereof. Other embodiments or modifications may be suggested to those having the benefit of the teaching herein, and all such embodiments or modifications are intended to be reserved as they fall within the spirit and scope of the subjoined claims.

In the drawing:

A single figure is provided illustrating therein a schematic arrangement partially in cross section of a system incorporating a fluid-type engine employing a thermodynamic cycle showing the novel arrangement of the expansion and compression chambers of the engine.

Attention is now directed to the drawing, in which a system 10 is illustrated in partial schematic form wherein the system 10, is in effect, closed and comprises, as a part thereof, a fluid-type engine 12 having a block 14 in which a cylinder 16 is bored and a piston 18 is reciprocably mounted. The piston 18 is suitably secured to a connecting rod 20 by a ball and socket arrangement 21 and to a crankshaft 22 disposed in a crankcase chamber 25 formed by a housing 26. The piston 18 comprises an enlarged base portion 28 and an extended reduced portion 30 forming a shoulder 32 therebetween. The shoulder 32 has a working surface 34 thereon forming one wall of a compression chamber 36 and the extended reduced portion 30 has a working surface 38 thereon forming one wall of an expansion chamber 40.

The compression chamber 36 has an inlet port 42 and an outlet port 44 circumferentially spaced and suitably arranged about the engine block 14 with the ports 42 and 44 each being communicable with the compression chamber 36. The outlet port 44 has a check valve 46 communicable therewith wherein the working fluid F from the compression chamber is directed through the outlet port 44 and the check valve 46 into a conduit 48 and thence into the power heat exchanger 50. Disposed intermediate the outlet valve 46 and the power heat exchanger 50 is a valve 52 and an accumulator 54 arrangement, which functions to provide rapid starting of the fluid-type engine after shutdown. A detailed description of the valve 52 and the accumulator arrangement 54 is more specifically described, disclosed, illustrated, shown and claimed in the U.S. application Serial Number 222,729 filed September 10, 1962 in the name of Stanley A. Weiland and assigned to the assignee of the present invention.

A conduit 56 connects the power heat exchanger 50 to an inlet valve 58 disposed adjacent one end portion of the engine block 14 in communication with the expansion chamber 40. An outlet valve 60 is also disposed at the one end portion of the engine block adjacent the inlet valve 58 to provide communication of the working fluid F in the expansion chamber 40 with a conduit 62. The conduit 62 directs the working fluid F from the expansion chamber 40 into a cooling heat exchanger 64 and through a conduit 66 into an inlet valve 68 connected to the inlet port 42 communicable with the compression chamber 36. The by-pass valve 70 is disposed in fluid communication with a conduit 74 shown connected to conduit 66 in the system. The by-pass valve 70 and conduit 74 arrangement is provided as a means for controlling the speed of the fluid-type engine 12 and the details thereof are more specifically described, disclosed, illustrated and shown in the U.S. application Serial Number 212,831 filed July 27, 1962 in the name of the instant inventor and assigned to the assignee of the present invention.

An oil separator 72 is connected to the conduit 62 intermediate the by-pass valve 70 and the cooling heat exchanger 64 wherein lubricating oil from the working fluid with which it passes through the system 10 during the operating cycle thereof is separated. The oil separator 72 is connected to a filter 73 which is connected to the engine crankcase housing 26 by suitable conduits. The lubricating oil enters into the system by conventional pumping means which directs the oil from the crankcase into the piston through suitable passageways (not shown). Lubricating oil as directed, is thereby disposed onto the cylinder walls and into the compression chamber becoming commingled with the working fluid. The specific details of the oil separator 72 and the filter 73 in combination with the system 10 are more fully described, disclosed, shown, illustrated and claimed in the U.S. application Serial Number 191,075 filed April 30 1962, now Patent No. 3,138,918, in the name of the instant inventor and assigned to the assignee of the present invention.

In order to compensate for certain conditions or factors, such as variations in the temperature of the working fluid F resulting from the effect created thereon the power heat exchanger 50 and the effective cooling of the working fluid F resulting from the heat exchanger 64, as well as providing for the substitution of different types of working fluid which may be employed in the system 10 to operate the fluid-type engine 12, there is provided apparatus which may take the form of a compensator or engine "multiplier" device 75. The specific details of the compensator or engine "multiplier" are more fully described, disclosed, shown, illustrated and claimed in the U.S. application Serial Number 202,285 filed June 13, 1962 in the name of the instant inventor and assigned of the present invention.

In order to more clearly illustrate the inventive concept shown herein by which the piston and cylinder arrangement is utilized in the design and operation of the fluid-type engine a typical operating cycle of the engine is set forth herein. The cycle will be described only to the extent necessary for a complete understanding of the present invention with values for the temperatures and pressures experienced by the working fluid F being merely exemplary and constituting representative amounts for illustrative purposes only.

In operation the piston 18, responsive to rotation of the crankshaft 22 by a suitable flywheel or the like (not shown), will be directed upwardly whereby a unit mass of working fluid F such as carbon dioxide at a temperature of approximately 70° F., is compressed in the compression chamber 36 to a pressure of approximately 6,000 p.s.i. and a temperature of approximately 300° F. During the compression stage of the cycle it can be seen that the piston 18 applies compressive loading to the connecting rod 20. At this temperature and pressure the carbon dioxide is directed through the outlet port 44, the outlet valve 46 and into the conduit 48. The valve 46 is actuated by suitable means (not shown) and synchronized in relationship to the cooperating elements of the cycle during engine operation. The compressed working fluid in the conduit 48 is directed through the valve 52 of the accumulator arrangement 54 and into the power heat exchanger 50 in which heat from any suitable source is applied to the working fluid F to substantially raise its temperature to approximately 500° F. while the pressure remains substantially constant. At this temperature and pressure, the carbon dioxide enters the inlet valve 58 through conduit 56 and upon synchronized opening of the inlet valve by suitable means (not shown) the working fluid F is directed to the expansion chamber 40. When the working fluid enters the expansion chamber 40, the increased volume therein provided causes the carbon dioxide to expand so that a given mass of working fluid F has a greater volume when it enters the expansion chamber 40 than it has as it is pumped out of the compression chamber 36. This expansion reduces the pressure and in turn reduces the temperature of the working fluid adiabatically. The piston 18 at this stage of operation, is in the top dead-center position and upon expansion of the carbon dioxide, is moved downwardly applying compressive loading to the connecting rod 20 and the crankshaft 22 arrangement imparting rotative movement to the crankshaft 22. Upon rotation of the crankshaft 22, through the rotation of a flywheel (not shown) attached hereto, the piston 18 is directed upwardly and the outlet valve 60 is opened allowing the escape of the expanded carbon dioxide at a reduced temperature and pressure of approximately 200° F. and 800 p.s.i. respectively, from the expansion chamber 40 into the conduit 62 through the by-pass valve 70 arrangement and into the cooling heat exchanger 64. The by-pass valve, in an opened position, permits the flow of the expanded working fluid F to continue through the conduit 62 and into the cooling heat exchanger 64. Upon leaving the cooling heat exchanger 64, the working fluid F is reduced to a temperature of approximately 70° F. and a pressure of 800 p.s.i. and enters the inlet valve 68 through the conduit 66. Simultaneously with the expansion stroke, the inlet valve 68 is opened to permit the carbon dioxide at the low temperature and pressure values to enter the compression chamber 36 whereupon the cycle is then repeated.

The fluid-type engine 12, as shown, discloses a single piston 18 and cylinder 16 arrangement, however, it is within the scope of the invention described herein to provide a multiplicity of such piston and cylinder arrangements within the engine block 14 wherein the provision of an axially spaced arrangement of the compression and expansion chambers is utilized with a system comprising a multiple piston and cylinder embodiment.

It can be readily seen from the above set forth operating cycle of the engine that during the expansion and compression strokes of the piston, compressive loading is continuously maintained on the piston member and accordingly, on the connecting rod 20. Through the axially spaced arrangement of the expansion and compression chambers, relative to the connecting rod 20, as disclosed in the drawing, a reversal of loading on the piston member will not occur. In the piston and cylinder arrangement whereby unidirectional loading on the piston member and in turn the connecting rod, is provided, undesirable features in the design of the engine are substantially reduced by elimination of the need for a conventional bulky wrist pin and connecting rod arrangement which heretofore had decidedly added to the size and weight of piston and cylinder type engines. The ball and socket arrangement between the piston and connecting rod elements of the engine is merely exemplary of the type of connection which can be utilized, and illustrates a connecting link arrangement which can be designed to resist a minimum bearing wear and loading of the character occuring in piston and cylinder arrangements designed for piston movement responsive to oppositely directed forces creating maximum loading on wrist pin connections or the like.

With respect to the structural arrangement of the engines, the reduction of the overall size and accordingly the weight thereof can best be illustrated by referring to an engine arrangement in which a piston member reciprocates within a cylinder wherein the compression chamber and the expansion chamber are disposed on opposite sides of the piston head or wherein there is provided a double expansion chamber reciprocating the piston head therebetween. In this type of arrangement, a piston shaft or link is necessary in order to connect the piston head with the piston connecting rod and thus to the crankshaft member to impart rotary motion to the crankshaft through the reciprocatory motion of the piston. The point of connection between the piston shaft and the connecting rod in the arrangement of the example utilizes a cross-head member wherein it is necessary to provide an additional bore in the engine construction. In this type of arrangement, it is necessary to provide three inline bores for the piston head and cylinder portion, the piston shaft and the opening in the cylinder through which the shaft extends and the bore guiding the block of the cross-head member in the reciprocatory movement thereof. In the instant concept, the cross-head has been eliminated and the connecting rod is connected directly to the base portion of the piston member thereby eliminating the necessity of an additional inline surface, consequently, providing a reduction in the number of inline bores. The inline bore for the cross-head member generally is longitudinally spaced from the crankshaft. The elimination of this element thereby results in a shortened longitudinal length of the engine and accordingly, substantially reduces the size and weight of the entire engine.

While the invention has been described, disclosed, illustrated and shown in terms of certain embodiments or modifications which is assumed in practice, the scope of the invention should not be deemed to be limited to the precise embodiments and modifications herein described, disclosed, illustrated or shown, since other embodiments and modifications are intended to be reserved where they fall within the scope of the claims herein appended.

I claim:

1. A fluid engine in which a working fluid traverses a thermodynamic cycle of compression, heating, expansion and cooling stages, said engine comprising;
   housing means defining cylinder means therein,
   piston means in said cylinder defining therebetween a compression chamber for receiving said fluid from the cooling stage of said cycle and an expansion chamber for receiving said fluid from the heating stage of said cycle,
   connecting means connecting said piston means to a working output shaft,
   said compression chamber being disposed in longitudinally spaced relationship with and intermediate of said expansion chamber and said connecting means.

2. A fluid engine in which a working fluid traverses a thermodynamic cycle of compression, heating, expansion and cooling stages, said engine comprising;
   housing means defining cylinder means therein,
   piston means in said cylinder means defining therebetween a compression chamber for receiving said fluid from the cooling stage of said cycle and an expansion chamber for receiving said fluid from the heating stage of said cycle,
   connecting means connecting said piston means to a working output shaft,
   said expansion chamber being disposed adjacent one end of said piston means with said compression chamber being disposed intermediate said expansion chamber and said connecting means.

3. A fluid engine in which a working fluid traverses a thermodynamic cycle of compression, heating, expansion and cooling, said engine comprising;
   housing means defining cylinder means therein,
   piston means in said cylinder defining therebetween a compression chamber for receiving said fluid from the cooling stage of said cycle and an expansion chamber for receiving said fluid from the heating stage of said cycle.
   connecting means for connecting said piston means to a working output shaft,
   said piston means comprising a base, an extended portion and a shoulder formed therebetween, said extended portion and a portion of said cylinder forming said expansion chamber, said shoulder and a portion of said cylinder forming said compression chamber, said base being connected to said connecting means with said expansion chamber and said compression chamber being longitudinally spaced from said connecting means and disposed to one side of said connecting means.

4. In a system having a working fluid traversing a thermodynamic cycle of compression, heating, expansion and cooling stages;
   a fluid engine provided with cylinder means therein,
   piston means operable in said cylinder means forming therebetween a working fluid compression chamber for receiving said working fluid from the cooling stage of said cycle and a working fluid expansion chamber for receiving said working fluid from the heating stage of said cycle.
   connecting means connecting said piston means to a working output shaft,
   valved inlet and outlet passageways opening to each of said chambers,
   conduit means connecting the inlet passageways of said chambers to the outlet passageways thereof,
   heating means associated with the conduit means that extends from said compression chamber outlet passageway,
   an arrangement of said piston and said cylinder means wherein said compression chamber is disposed in longitudinally spaced relationship with and intermediate of said connecting means and wherein said arrangement effects unidirectional loading on said piston means during said expansion and said compression stages of said cycle.

5. In a system having a working fluid traversing a thermodynamic cycle of compression, heating, expansion and cooling stages;
   a fluid engine provided with cylinder means therein,
   piston means operable in said cylinder means forming therebetween a working fluid compression chamber for receiving said working fluid from the cooling stage of said cycle and a working fluid expansion chamber for receiving said working fluid from the heating stage of said cycle.
   connecting means connecting said piston means to a working output shaft,
   valved inlet and outlet passageways opening to each of said chambers,
   conduit means connecting the inlet passageways of said chambers to the outlet passageways thereof,
   heating means associated with the conduit means that extends from said compression chamber outlet passageway,
   an arrangement of said piston means and said cylinder means wherein said working fluid expansion chamber is disposed adjacent one end of said piston means with said working fluid compression chamber being disposed intermediate said expansion chamber and said connecting means, said arrangement effecting unidirectional loading on said piston means and said connecting means during said expansion and said compression stages of said cycle.

6. In a system having a working fluid traversing a thermodynamic cycle of compression, heating, expansion and cooling stages;
   a fluid engine provided with cylinder means therein,
   piston means operable in said cylinder means forming a working fluid compression chamber and a working fluid expansion chamber therebetween,
   connecting means connecting said piston means to a working output shaft,
   valved inlet and outlet passageways opening to each of said chambers,
   conduit means connecting the inlet passageways of said chambers to the outlet passageways thereof,
   heating means associated with the conduit means that extends from said compression chamber outlet passageway,
   cooling means associated with conduit means which extends to the compression chamber inlet passageway, an arrangement of said piston means and said cylinder means wherein said piston means comprises;
a base,
an extended portion extending from said base,
a shoulder formed between said extending portion and said base wherein said extending portion and a portion of said cylinder means form said expansion chamber, said shoulder and a portion of said cylinder means form said compression chamber, said base being connected to said connecting means and said expansion chamber and said compression chamber being longitudinally spaced from said connecting means and disposed at one side thereof with said arrangement effecting unidirectional loading on said piston means and said connecting means during said expansion and said compression stages of said cycle.

References Cited by the Examiner

UNITED STATES PATENTS

| | | | |
|---|---|---|---|
| 2,067,453 | 1/37 | Lee | 60—24 X |
| 2,643,507 | 6/53 | Dros | 60—24 |
| 3,009,315 | 11/61 | Drumm | 60—24 |

JULIUS E. WEST, *Primary Examiner.*

ROBERT R. BUNNEVICH, *Examiner.*